(12) United States Patent
Gonzalez

(10) Patent No.: US 8,505,656 B1
(45) Date of Patent: Aug. 13, 2013

(54) AUTOMOTIVE HAULING SYSTEM

(71) Applicant: Jesus Gonzalez, Jacksonville, FL (US)

(72) Inventor: Jesus Gonzalez, Jacksonville, FL (US)

(*) Notice: Subject to any disclaimer, the term of this patent is extended or adjusted under 35 U.S.C. 154(b) by 0 days.

(21) Appl. No.: 13/776,955

(22) Filed: Feb. 26, 2013

Related U.S. Application Data

(63) Continuation-in-part of application No. 12/703,328, filed on Feb. 10, 2010.

(51) Int. Cl.
*B62D 61/10* (2006.01)

(52) U.S. Cl.
USPC .......... 180/22; 180/24.01; 280/426; 280/442; 280/789; 105/215.2

(58) Field of Classification Search
USPC ............. 180/22, 24.01, 24.02, 440; 280/426, 280/442, 444, 789; 105/215.2
See application file for complete search history.

(56) References Cited

U.S. PATENT DOCUMENTS

| | | | |
|---|---|---|---|
| 1,815,416 A | 7/1931 | Marcum | |
| 1,827,898 A | 10/1931 | Moore | |
| 1,932,417 A | 10/1933 | Marcum | |
| 2,426,342 A | 8/1947 | Couse | |
| 3,002,762 A | 10/1961 | Scheel | |
| 3,199,622 A | 8/1965 | Cook | |
| 4,050,534 A | 9/1977 | Nelson et al. | |
| 4,796,714 A | 1/1989 | Momiyama | |
| 4,944,526 A | 7/1990 | Eberling | |
| 4,982,976 A * | 1/1991 | Kramer | 280/426 |
| 5,016,544 A | 5/1991 | Woollam | |
| D317,425 S | 6/1991 | Vysotsky et al. | |
| 5,213,353 A | 5/1993 | Williams | |
| 5,329,451 A | 7/1994 | Notsu | |
| 5,746,441 A | 5/1998 | Vandenberg | |
| 6,059,056 A | 5/2000 | Becker | |
| 6,131,691 A | 10/2000 | Morch | |
| 6,267,198 B1 * | 7/2001 | Hurlburt et al. | 180/414 |
| 6,308,976 B1 * | 10/2001 | Mitchell | 280/419 |
| 6,341,251 B1 * | 1/2002 | Enomoto et al. | 701/41 |
| 6,409,199 B1 | 6/2002 | Boyd | |
| 6,488,114 B1 * | 12/2002 | McMahon et al. | 180/414 |
| 6,527,078 B1 | 3/2003 | Nelson | |
| 6,572,124 B2 | 6/2003 | Mlsna et al. | |
| 6,604,753 B1 | 8/2003 | Boyd | |
| 6,796,572 B1 * | 9/2004 | McGhie | 280/426 |
| 6,968,913 B1 * | 11/2005 | Priepke | 180/6.24 |
| 7,686,320 B1 * | 3/2010 | McGhie et al. | 280/442 |
| 8,419,032 B1 * | 4/2013 | McGhie et al. | 280/124.157 |
| 2004/0188971 A1 * | 9/2004 | Rudder et al. | 280/124.111 |
| 2008/0048414 A1 * | 2/2008 | Van Mill et al. | 280/426 |

* cited by examiner

*Primary Examiner* — Toan To

(57) ABSTRACT

The present invention features an automobile hauling system for improved maneuverability and hauling capacity for a tractor and trailer combination used to transport automobiles. The system features a cab-over automobile hauling tractor having an extended wheelbase frame with first and second side notches. The tractor features a first steering axle assembly, a second steering axle assembly, and an h-link. A pitman arm first end is located on a steering box and a pitman arm second end is pivotally located on a first drag link. The tractor features a supplemental axle assembly and a drive axle assembly located on the frame bottom. The system features an automobile hauling trailer pivotally located on the frame top side.

5 Claims, 4 Drawing Sheets

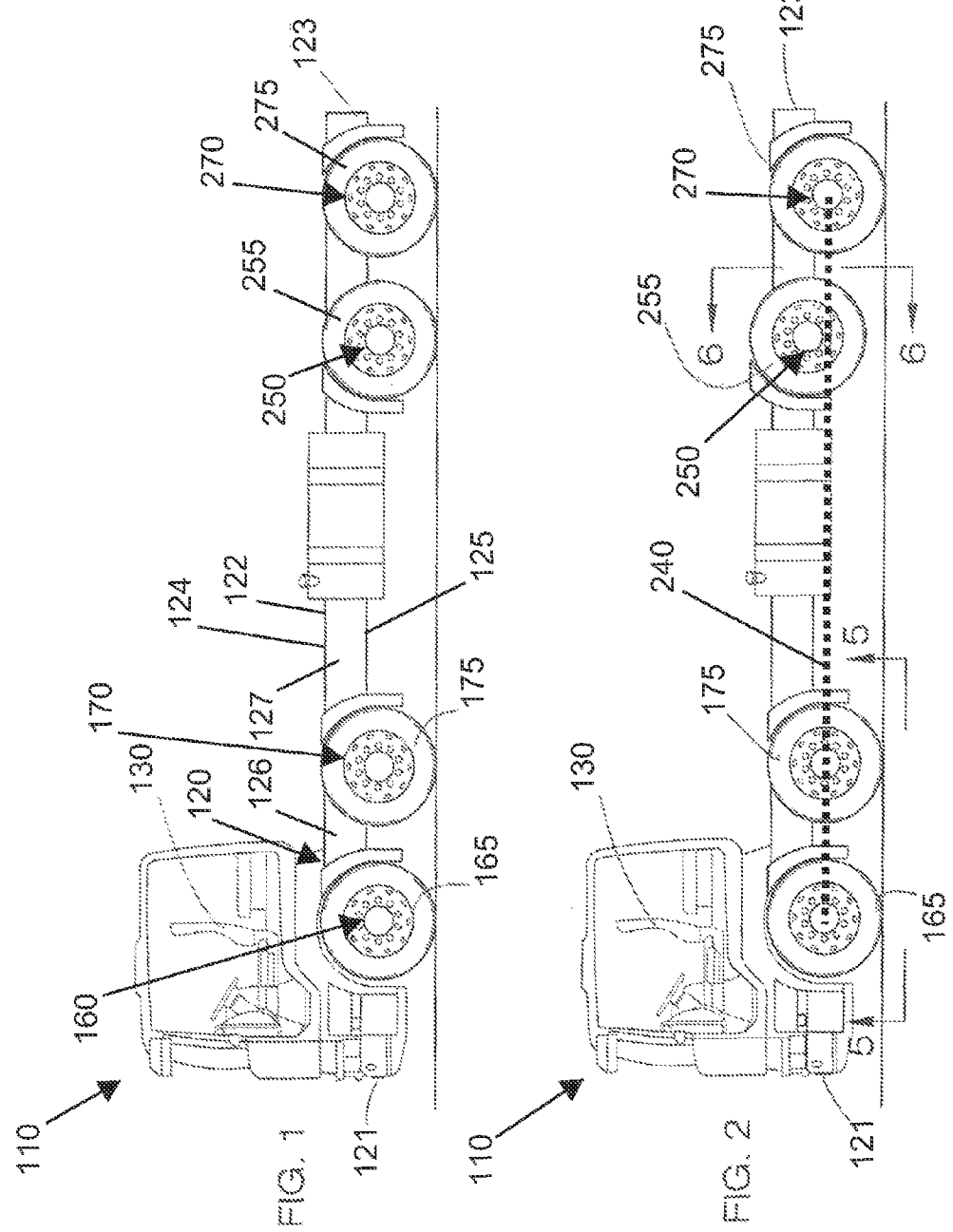

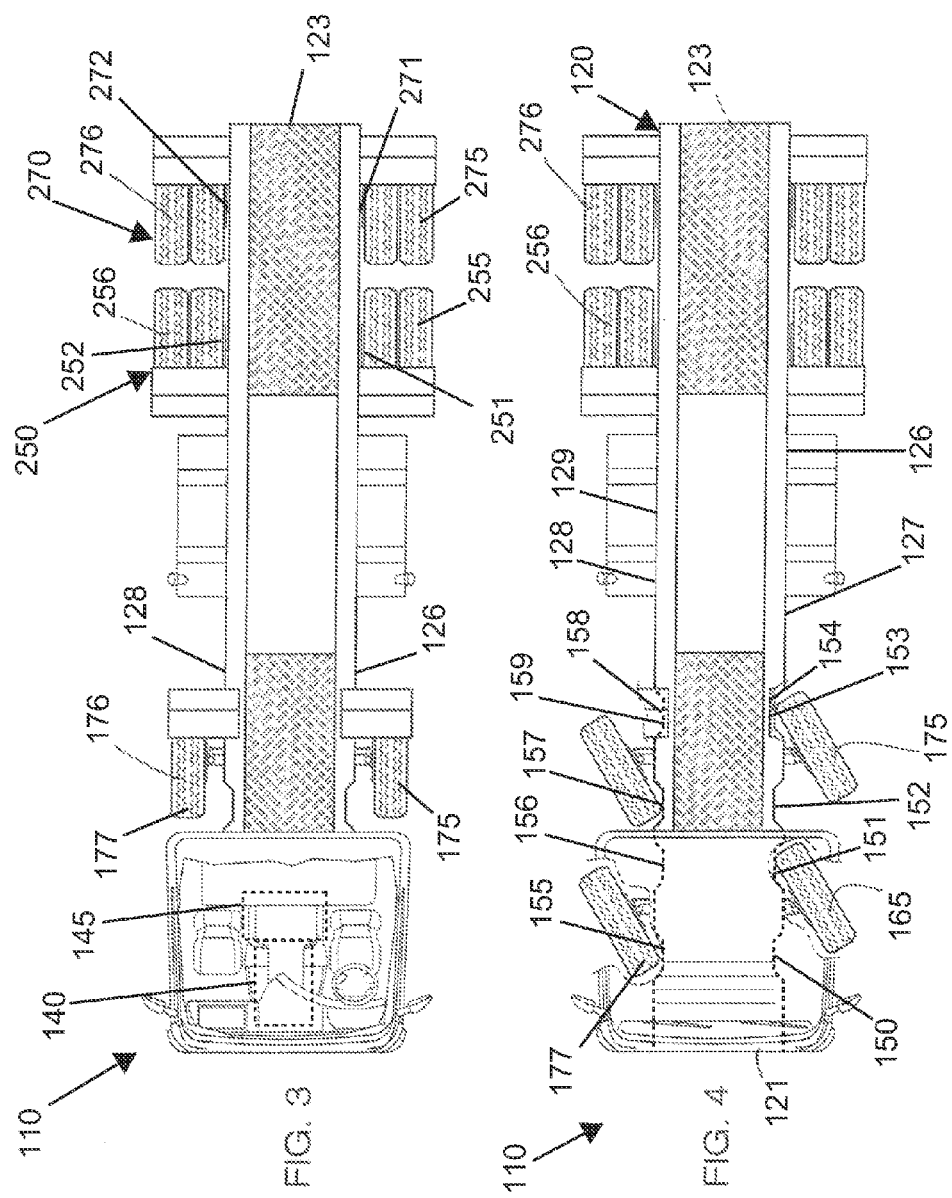

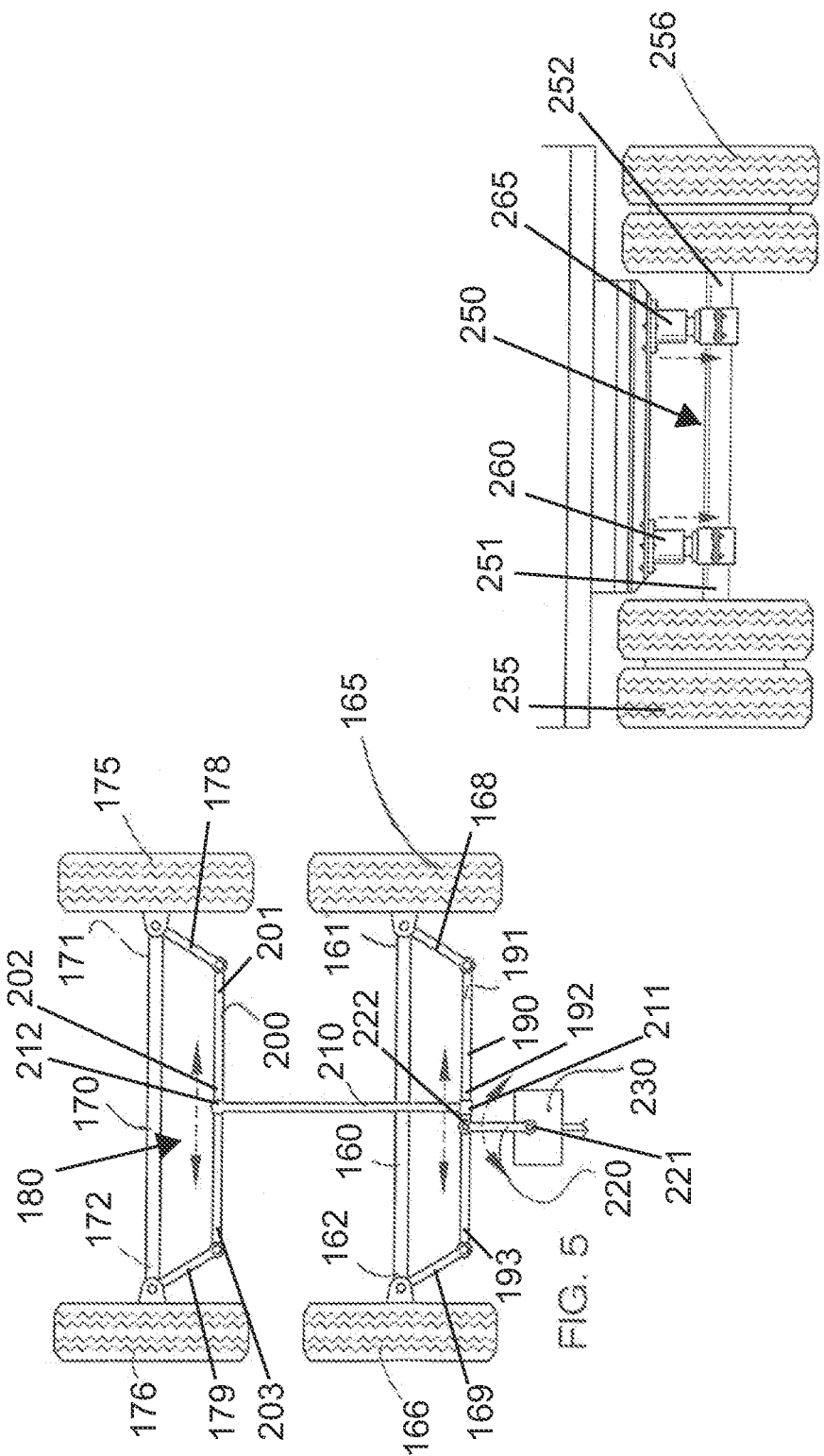

AUTOMOTIVE HAULING SYSTEM

CROSS REFERENCE

This application claims priority to U.S. Non-Provisional patent application Ser. No. 12/703,328, filed Feb. 10, 2010, the disclosure(s) of which is/are incorporated herein by reference in its entirety,

FIELD OF THE INVENTION

The present invention relates to tractor and trailer combinations, or more specifically, tractor and trailer combinations used to transport automobiles.

BACKGROUND OF THE INVENTION

Tractor and trailer combinations have been used for transportation for a number of years. The tractor unit is an engine powered truck used to haul a trailer for over the road transport of many things including automobiles. Tractor and trailer combination units used to transport automobiles are specially equipped due to the weight and side of the automobiles. The present invention features an automobile hauling system for improved maneuverability and hauling capacity for a tractor and trailer combination used to transport automobiles.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features an automobile hauling system for improved maneuverability and hauling capacity for a tractor and trailer combination used to transport automobiles. In some embodiments, the system comprises a cab-over automobile hauling tractor having an extended wheelbase frame with first side notches and second side notches to provide wheel clearance when turning.

In some embodiments, the tractor comprises a first steering axle assembly, a second steering axle assembly, and an ft-link. In some embodiments, a pitman arm first end is located on a steering box and a pitman arm second end is pivotally located on a first drag link middle close to a cross link first end of the h-link. In some embodiments, the h-link is located in a plane parallel with the frame.

In some embodiments, in a first position, a pitman arm is moved in a first direction, thereby moving the h-link in the first direction in the plane, thereby moving an anterior end of the first steering wheel, the second steering wheel, the third steering wheel and the fourth steering wheel each in the first direction. In some embodiments, in a second position, the pitman arm is moved in a second direction, thereby moving the h-link in the second direction in the plane, thereby moving the anterior end of the first steering wheel, the second steering wheel, the third steering wheel and the fourth steering wheel in the second direction.

In some embodiments, the tractor comprises a supplemental axle assembly positionably located on the frame bottom close to the frame middle via a first retractor and a second retractor. In some embodiments, in a first position, the first supplemental wheel and the second supplemental wheel are located offset from a ground surface via the first retractor and the second retractor. In some embodiments, in a second position, the first supplemental wheel and the second supplemental wheel are located on the ground surface, wherein the supplemental axle assembly is to assist in bearing load weight.

In some embodiments, the tractor comprises a drive axle assembly having a first drive wheel located on a drive axle first side and a second drive wheel located on a drive axle second side. In some embodiments, the drive axle is affixedly located on the frame bottom close to the frame posterior end. In some embodiments, the drive axle assembly is operatively connected to the engine via a transmission.

In some embodiments, the system comprises an automobile hauling trader pivotally located on the frame top side.

BRIEF DESCRIPTION OF THE DRAWINGS

FIG. 1 shows a side view of the tractor of the present invention featuring a supplemental axle assembly in a second position.

FIG. 2 shows a side view of the tractor of the present invention featuring a supplemental axle assembly in a first position.

FIG. 3 shows a top view of the tractor of the present invention.

FIG. 4 shows a top view of the tractor of the present invention featuring the first steering wheel and the second steering wheel in the first position.

FIG. 5 shows a bottom view of the h-link of the present invention.

FIG. 6 shows a rear view of the supplemental axle assembly of the present invention.

DESCRIPTION OF PREFERRED EMBODIMENTS

Figure 7:
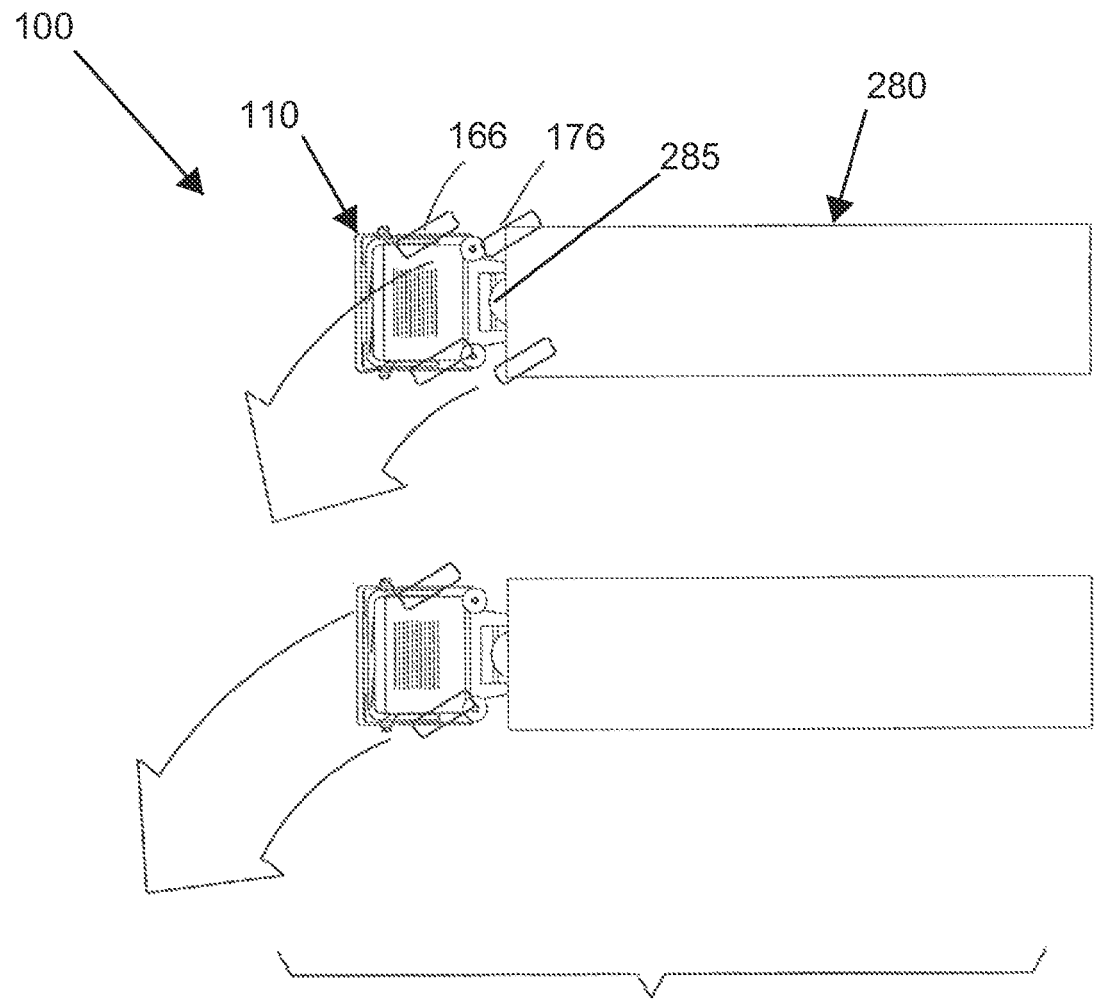
FIG. 7 shows a top view of the present invention compared with a typical tractor and trailer combination system.

Following is a list of elements corresponding to a particular element referred to herein:
100 Automobile hauling system
110 Tractor
120 Frame
121 Frame anterior end
122 Frame middle
123 Frame posterior end
124 Frame top side
125 Frame bottom side
126 Frame first side
127 Frame first side outside surface
128 Frame second side
129 Frame second side outside surface
130 Cab
140 Engine
145 Transmission
150 First side first notch
151 First side second notch
152 First side third notch
153 First side fourth notch
154 First side notch
155 Second side first notch
156 Second side second notch
157 Second side third notch
158 Second side fourth notch
159 Second side notch
160 First steering axle assembly 161 First steering axle first end
162 First steering axle second end
165 First steering wheel
166 Second steering wheel
168 First tie rod arm
169 Second tie rod arm
170 Second steering axle assembly
171 Second steering axle first end
172 Second steering axle second end
175 Third steering wheel
176 Fourth steering wheel
177 Anterior wheel end
178 Third tie rod arm
179 Fourth tie rod arm
180 H-link
190 First drag link
191 First drag link first end
192 First drag link middle
193 First drag link second end
200 Second drag link
201 Second drag link first end
202 Second drag link middle
203 Second drag link second end
210 Cross link
211 Cross link first end
212 Cross link second end
220 Pitman arm
221 Pitman arm first end
222 Pitman arm second end
230 Steering box
240 Plane
250 Supplemental axle assembly
251 Supplemental axle first side
252 Supplemental axle second side
255 First supplemental wheel
256 Second supplemental wheel
260 First retractor
265 Second retractor
270 Drive axle assembly
271 Drive axle first side
272 Drive axle second side
275 First drive wheel
276 Second drive wheel
280 Trailer
285 Trailer hitch Referring now to FIG. 1-7, the present invention features an automobile hauling system (100) for improved maneuverability and hauling capacity for a tractor (110) and trailer (280) combination used to transport automobiles. In some embodiments, the system (100) comprises a cab-over automobile hauling tractor (110).

In some embodiments, the tractor (110) comprises an extended wheelbase frame (120) having a cab-over cab (130) and an engine (140) located on a frame anterior end (121) thereon. In some embodiments, the frame (120) comprises the frame anterior end (121), a frame middle (122), a frame posterior end (123), a frame top side (124), a frame bottom side (125), a frame first side (126), and a frame second side (128).

In some embodiments, the frame (120) comprises a first side first notch (150), a first side second notch (151), a first side third notch (152), and a first side fourth notch (153), hereinafter referred to as first side notches (154), each sequentially located on an frame first side outside surface (127) of the frame first side (126) thereon from the frame anterior end (121) to the frame middle (122).

In some embodiments, the frame (120) comprises a second side first notch (155), a second side second notch (156), a second side third notch (157), and a second side fourth notch (158), hereinafter referred to as second side notches (159), each sequentially located on an frame second side outside surface (129) of the frame second side (128) thereon from the frame anterior end (121) to the frame middle (122).

In some embodiments, it is critical that the first side notches (154) and the second side notches (159) provide wheel clearance when turning.

In some embodiments, the tractor (110) comprises a first steering axle assembly (160) having a first steering wheel (165) pivotally located on a first steering axle first end (161) thereon and a second steering wheel (166) pivotally located on a first steering axle second end (162) thereon. In some embodiments, a first tie rod arm (168) is located on the first steering wheel (165) and a second tie rod arm (169) is located on the second steering wheel (166).

In some embodiments, the tractor (110) comprises a second steering axle assembly (170) having a third steering wheel (175) pivotally located on a second steering axle first end (171) thereon and a fourth steering wheel (176) pivotally located on a second steering axle second end (172) thereon. In some embodiments, a third tie rod arm (178) is located on the third steering wheel (175) and a fourth tie rod arm (179) is located on the fourth steering wheel (176).

In some embodiments, the tractor (110) comprises an h-link (180) having a first drag link (190), a second drag link (200), and a cross link (210). In some embodiments, the first drag link (190) is located parallel to the second drag link (200). In some embodiments, the first drag link (190) comprises a first drag link first end (191), a first drag link middle (192), and a first drag link second end (193). In some embodiments, the second drag link (200) comprises a second drag link first end (201), a second drag link middle (202), and a second drag link second end (212). In some embodiments, the cross link (210) comprises a cross link first end (211) located on the first drag link middle (192) and a cross link second end (212) located on the second drag link middle (202). In some embodiments, the cross link (210) is located perpendicularly to the first drag link (190) and the second drag link (200).

In some embodiments, a pitman arm first end (221) is located on a steering box (230). In some embodiments, a pitman arm second end (222) is pivotally located on the first drag link middle (192) close to the cross link first end (211). In some embodiments, the h-link (180) is located in a plane (240) parallel with the frame (120).

In some embodiments, in a first position, a pitman arm (220) is moved in a first direction, thereby moving the h-link (180) in the first direction in the plane (240), thereby moving an anterior wheel end (177) of each of the first steering wheel (165), the second steering wheel (166), the third steering wheel (175) and the fourth steering wheel (176) in the first direction. In some embodiments, the first direction is close to the frame first side (126).

In some embodiments, in a second position, the pitman arm (220) is moved in a second direction, thereby moving the h-link (180) in the second direction in the plane (240), thereby moving the anterior wheel end (177) of each the first steering wheel (165), the second steering wheel (166), the third steering wheel (175) and the fourth steering wheel (176) in the second direction.

In some embodiments, it is critical that the first steering axle assembly (160), the second steering axle assembly (170), and the h-link (180) reduce the turning radius of the system (100) compared to a standard tractor and trailer combination.

In some embodiments, the frame (120) comprises a supplemental axle assembly (250) having a first supplemental wheel (255) located on a supplemental axle first side (251) and a second supplemental wheel (256) located on a supplemental axle second side (252). In some embodiments, the supplemental axle assembly (250) is positionably located on the frame bottom close to the frame middle (122).

In some embodiments, in a first position, the first supplemental wheel (255) and the second supplemental wheel (256) are located offset from a ground surface.

In some embodiments, in a second position, the first supplemental wheel (255) and the second supplemental wheel (256) are located on the ground surface. In some embodiments, it is critical that the supplemental axle assembly (250) is to assist in bearing load weight.

In some embodiments, the frame (120) comprises a drive axle assembly (270) having a first drive wheel (275) located on a drive axle first side (271) and a second drive wheel (276) located on a drive axle second side (272). In some embodiments, the drive axle is affixedly located on the frame bottom close to the frame posterior end (123). In some embodiments, the drive axle assembly (270) is operatively connected to the engine (140) via a transmission (145).

In some embodiments, the system (100) comprises an automobile hauling trailer (280) pivotally attached to a trailer hitch (285) located on the frame (120).

In some embodiments, the system (100) comprises a flatbed located on the frame top side (124) posterior to the cab (130). In some embodiments, the flatbed is adapted to transport an automobile. In some embodiments, it is critical that the system (100) includes both a flatbed, and a trailer hitch (285). In some embodiments, it is critical that the system (100) includes both a flatbed, a trailer hitch (285), and a trailer (280).

In some embodiments, the first steering axle assembly (160) and the second steering axle assembly (170) comprise the same turning arc of rotation.

In some embodiments, the first steering axle assembly (160) and the second steering axle assembly (170) comprise different turning arcs of rotation.

In some embodiments, the first steering axle assembly (160) is retractable from the ground surface. In some embodiments, the first steering axle assembly (160) is attached to the frame bottom side (125) via a first retractor (260) and a second retractor (265). In some embodiments, the first retractor (260) and the second retractor (265) raise and alternately lower the second steering axle assembly (170). In some embodiments, the first retractor (260) and the second retractor (265) are air actuated. In some embodiments, the first retractor (260) and the second retractor (265) are hydraulically actuated. In some embodiments, the first retractor (260) and the second retractor (265) are gear driven. In some embodiments, the first retractor (260) and the second retractor (265) are vertically located perpendicularly to the frame bottom side (125).

In some embodiments, the second steering axle assembly (170) is retractable from the ground surface. In some embodiments, the second steering axle assembly (170) is attached to the frame bottom side (125) via a first retractor (260) and a second retractor (265). In some embodiments, the first retractor (260) and the second retractor (265) raise and alternately lower the second steering axle assembly (170). In some embodiments, the first retractor (260) and the second retractor (265) are air actuated. In some embodiments, the first retractor (260) and the second retractor (265) are hydraulically actuated. In some embodiments, the first retractor (260) and the second retractor (265) are gear driven. In some embodiments, the first retractor (260) and the second retractor (265) are vertically located perpendicularly to the frame bottom side (125).

In some embodiments, the tractor (110) comprises a first steering axle assembly (160) located on a frame bottom side (125) close to the frame anterior end (121). In some embodiments, the tractor (110) comprises no second steering axle assembly (170).

In some embodiments, the supplemental axle assembly (250) is attached to the frame bottom side (125) via a first retractor (260) and a second retractor (265). In some embodiments, the first retractor (260) and the second retractor (265) raise and alternately lower the supplemental axle assembly (250). In some embodiments, the first retractor (260) and the second retractor (265) are air actuated. In some embodiments, the first retractor (260) and the second retractor (265) are hydraulically actuated. In some embodiments, the first retractor (260) and the second retractor (265) are gear driven. In some embodiments, the first retractor (260) and the second retractor (265) are vertically located perpendicularly to the frame bottom side (125).

In some embodiments, the supplemental axle assembly (250) is attached to the frame bottom side (125) and actuated via a first retractor (260). In some embodiments, the first retractor (260) raises and alternately lowers the supplemental axle assembly (250). In some embodiments, the first retractor (260) is air actuated. In some embodiments, the first retractor (260) is hydraulically actuated. In some embodiments, the first retractor (260) is gear driven. In some embodiments, the first retractor (260) is vertically located perpendicularly to the frame bottom side (125). In some embodiments, the first retractor (260) is horizontally located perpendicularly to the frame bottom side (125).

In some embodiments, a trailer hitch (285) is located on frame top side (124) close to the frame posterior end (123).

In some embodiments, a trailer hitch (285) is located on and projecting in a posterior direction from the frame posterior end (123).

As used herein, the term "about" refers to plus or minus 10% of the referenced number.

The disclosures of the following U.S. patents are incorporated in their entirety by reference herein: U.S. Pat. No. 6,604,753 B1; U.S. Pat. No. 6,572,124; U.S. Pat. No. 6,527,078 B1; U.S. Pat. No. 6,409,199 B1; U.S. Pat. No. 6,131,691; U.S. Pat. No. 6,059,056; U.S. Pat. No. 5,329,451; U.S. Pat. No. 5,213,353; U.S. Pat. No. 4,050,534; U.S. Pat. No. 3,002,762; and U.S. Pat. No. 1,815,416.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures.

The reference numbers recited in the below claims are solely for ease of examination of this patent application, and are exemplary, and are not intended in any way to limit the scope of the claims to the particular features having the corresponding reference numbers in the drawings.

What is claimed is:

1. An automobile hauling system (100) for improved maneuverability and hauling capacity for a tractor (110) and trader (280) combination used to transport automobiles, wherein the system (100) comprises:
   (a) a cab-over automobile hauling tractor (110), wherein the tractor (110) comprises:
      (i) an extended wheelbase frame (120) having a cab-over cab (130) and an engine (140) disposed on a frame anterior end (121) thereon, wherein the frame (120) comprises the frame anterior end (121), a frame middle (122), a frame posterior end (123), a frame top side (124), a frame bottom side (125), a frame first side (126), and a frame second side (128),
   wherein the frame (120) comprises a first side first notch (150), a first side second notch (151), a first side third notch (152), and a first side fourth notch (153), hereinafter referred to as first side notches (154), each sequentially disposed on a frame first side outside surface (127) of the frame first side (126) thereon from the frame anterior end (121) to the frame middle (122),
   wherein the frame (120) comprises a second side first notch (155), a second side second notch (156), a second side third notch (157), and a second side fourth notch (158), hereinafter referred to as second side notches (159), each sequentially disposed on a frame second side outside surface (129) of the frame second side (128) thereon from the frame anterior end (121) to the frame middle (122),
   wherein the first side notches (154) and the second side notches (159) provide wheel clearance when turning,
      (ii) a first steering axle assembly (160) having a first steering wheel (165) pivotally disposed on a first steering axle first end (161) thereon and a second steering wheel (166) pivotally disposed on a first steering axle second end (162) thereon, wherein a first tie rod arm (168) is disposed on the first steering wheel (165) and a second tie rod arm (169) is disposed on the second steering wheel (166),
      (iii) a second steering axle assembly (170) having a third steering wheel (175) pivotally disposed on a second steering axle first end (171) thereon and a fourth steering wheel (176) pivotally disposed on a second steering axle second end (172) thereon, wherein a third tie rod arm (178) is disposed on the third steering wheel (175) and a fourth tie rod arm (179) is disposed on the fourth steering wheel (176),
      (iv) an h-link (180) having a first drag link (190), a second drag link (200), and a cross link (210), wherein the first drag link (190) is disposed parallel to the second drag link (200), wherein the first drag link (190) comprises a first drag link first end (191), a first drag link middle (192), and a first drag link second end (193), wherein the second drag link (200) comprises a second drag link first end (201), a second drag link middle (202), and a second drag link second end (212), wherein the cross link (210) comprises a cross link first end (211) disposed on the first drag link middle (192) and a cross link second end (212) disposed on the second drag link middle (202), wherein the cross link (210) is disposed perpendicularly to the first drag link (190) and the second drag link (200),
   wherein a pitman arm first end (221) is disposed on a steering box (230), wherein a pitman arm second end (222) is pivotally disposed on the first drag link middle (192) proximal to the cross link first end (211), wherein the h-link (180) is disposed in a plane (240) parallel with the frame (120);
   wherein in a first position, a pitman arm (220) is disposed in a first direction, thereby disposing the h-link (180) in the first direction in the plane (240), thereby disposing an anterior wheel end (177) of each of the first steering wheel (165), the second steering wheel (166), the third steering wheel (175) and the fourth steering wheel (176) in the first direction,
   wherein in a second position, the pitman arm (220) is disposed in a second direction, thereby disposing the h-link (180) in the second direction in the plane (240), thereby disposing the anterior wheel end (177) of each the first steering wheel (165), the second steering wheel (166), the third steering wheel (175) and the fourth steering wheel (176) in the second direction,
   wherein the first steering axle assembly (160), the second steering axle assembly (170), and the h-link (180) reduce the turning radius of the system (100),
      (v) a supplemental axle assembly (250) having a first supplemental wheel (255) disposed on a supplemental axle first side (251) and a second supplemental wheel (256) disposed on a supplemental axle second side (252), wherein the supplemental axle assembly (250) is positionably disposed on the frame bottom proximal to the frame middle (122),
   wherein in a first position, the first supplemental wheel (255) and the second supplemental wheel (256) are disposed offset from a ground surface,
   wherein in a second position, the first supplemental wheel (255) and the second supplemental wheel (256) are disposed on the ground surface, wherein the supplemental axle assembly (250) is to assist in bearing load weight,
      (vi) a drive axle assembly (270) having a first drive wheel (275) disposed on a drive axle first side (271) and a second drive wheel (276) disposed on a drive axle second side (272), wherein the drive axle is affixedly disposed on the frame bottom side (125) proximal to the frame posterior end (123), wherein the drive axle assembly (270) is operatively connected to the engine (140) via a transmission (145); and
   (b) an automobile hauling trailer (280) pivotally attached to a trailer hitch (285) disposed on the frame (120).

2. The system (100) of claim 1, wherein the first steering axle assembly (160) and the second steering axle assembly (170) each comprise the same arc of rotation.

3. The system (100) of claim 1, wherein the first steering axle assembly (160) and the second steering axle assembly (170) each comprise different arcs of rotation.

4. The system (100) of claim 1, wherein the first steering axle assembly (160) is retractable from the ground surface.

5. The system (100) of claim 1, wherein the second steering axle assembly (170) is retractable from the ground surface.

* * * * *